March 20, 1945.     V. E. SMITH     2,372,027
BORING TOOL
Filed Dec. 3, 1943
FIG. 1.     FIG. 2.     FIG. 3.
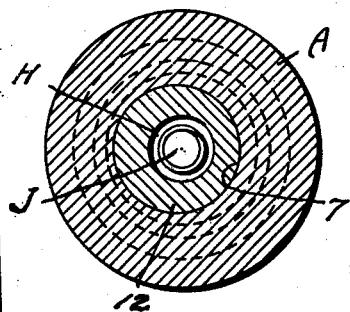
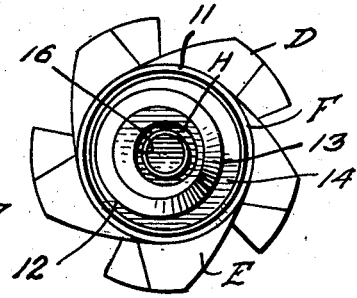
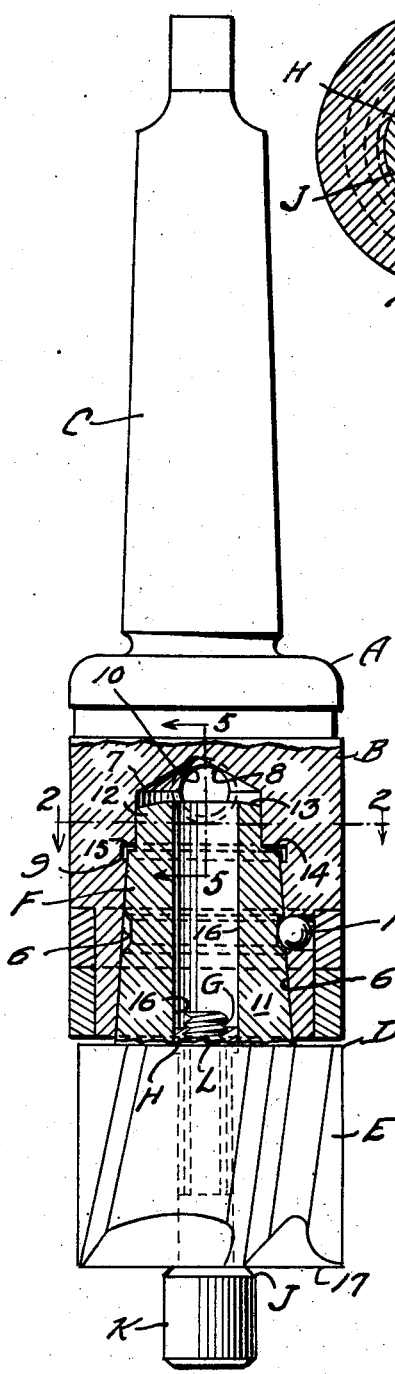
FIG. 4.
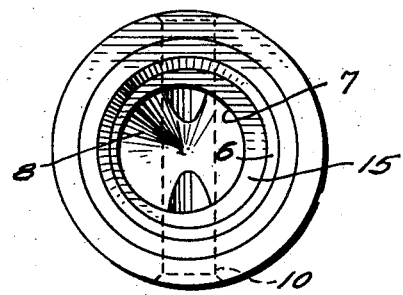
FIG. 5.
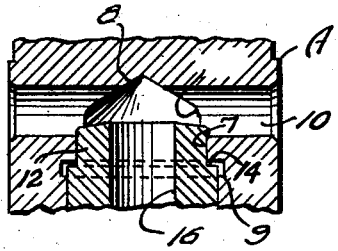
INVENTOR.
Victor E. Smith
BY
ATTORNEYS.

Patented Mar. 20, 1945

2,372,027

UNITED STATES PATENT OFFICE 2,372,027

BORING TOOL

Victor E. Smith, Detroit, Mich., assignor to Mildred E. Smith, Detroit, Mich.

Application December 3, 1943, Serial No. 512,825

4 Claims. (Cl. 77—58)

The present invention relates to boring tools comprising a socket holder and cutter separable therefrom for purposes of replacement or interchangeability.

The principal object of the invention is to provide such a combination, which is inexpensive to manufacture, having a positive drive connection between the rotary socket holder and cutter, not likely to be broken even though subjected to considerable shock or strain.

A further object is to provide a boring tool in which the cutter is driven by the socket holder through both frictional-wedging engagement, and by positive keying action.

Another object is to provide such a combination where the cutter is particularly intended for counterboring purposes and where a pilot is used to guide the tool into the work, the pilot entering a hole or socket previously formed in the work.

Other objects and advantages of the invention will appear in the following detailed description, taken in connection with the accompanying drawing, forming a part of this specification, and in which drawing:

Fig. 1 is a view partly in elevation and partly in vertical section of a combination of socket holder and cutter constructed according to the present invention.

Fig. 2 is a cross sectional view on the line 2—2 of Fig. 1.

Fig. 3 is top plan view of the cutter.

Fig. 4 is bottom plan view of the socket holder.

Fig. 5 is a fragmentary cross sectional view on the line 5—5 of Fig. 1.

In the drawing A designates a socket holder including a socket portion B and a shank C for insertion in a suitable chuck or other driving means, not shown; and D a cutter including a head E and a shank F for insertion into the socket portion B to form a driving connection therewith. In the example shown, the cutter D is a counterborer including a pilot G comprising a nut H and a pilot rod J having a head K and a stem L. The preferred details of the pilot are disclosed and claimed in my copending application for patent filed Dec. 3, 1943, Serial No. 512,827.

The drawing also shows a retainer means M adapted to prevent accidental removal of the cutter from the socket holder but forms no essential part of the present invention, it being disclosed and claimed in my copending application for patent filed Dec. 3, 1943, Serial No. 512,826.

The socket portion B is formed to provide a major relatively long, tapered, central bore 6 and a reduced minor, eccentrically located cylindrical bore 7 forming an extension of the bore 6. These bores may be accurately formed by the use of standard tools and require no difficult machining. For instance the bore 7 may be formed by drilling, using a drill having the usual tapered leading end which provides the conical cavity 8 shown in Figs. 1 and 4. It is also preferred to provide a relatively short bore 9 between the bores 6 and 7 of greater diameter than and coaxial with bore 6 for a purpose to be subsequently set forth.

In the example shown, a transverse hole 10 is provided through the walls of the socket portion adjacent the inner end of bore 7, affording a way intersecting the latter, for accommodation of any convenient cutter releasing element, such as a drift-pin, not shown, but usually used to release the shank of the cutter from the socket.

The shank F of the cutter includes a major, frusto-conical portion 11 which is placed in frictional-wedging relation to the wall of bore 6, and a minor, reduced eccentrically located, cylindrical portion 12 forming an extension of the portion 11 which is placed in telescopic relation in the bore 7. If desired the upper or free end of portion 12 may have a chamfered edge 13 to more readily coact with the tapered releasing element above referred to.

It is to be noted from Figs. 1 and 3 that the cylindrical portion 12 is within the circle defining the upper or smaller end of the frusto-conical portion 11, providing a narrow shoulder or ledge 14 which confronts the upper wall 15 of bore 9.

The cutter D, in the example shown, is provided with an axial way 16 open to the leading edge 17 of head E and open to the free end of minor portion 12, and extending throughout the length of the portions 11 and 12, to accommodate the stem L of the pilot, as the head E is ground away due to wear and sharpening. This way 16 also facilitates assembling the tool and particularly placing of the nut H as set forth in my aforesaid application Serial No. 512,827, and aids in cooling of the tool when in operation since heat may rise in the way 16 and find egress through the hole 10.

The bore 9 is provided primarily to assure a frictional-wedging drive connection between the socket holder and cutter, since the ledge 14 does not contact the wall 15, and the tapered bore 6 may be made accurate and clear of any fillet at its inner end. The overall length of the stem F is sufficient so that its upper end partially intersects the way of hole 10 so as to encounter the tapered cutter releasing element above referred to. The primary function of the retainer M is to prevent the cutter from accidentally dropping or being "shot" from the holder when the cutter releasing element is given a sharp blow to "break" the frictional-wedging relation of the cutter stem with the wall of bore 6, but may be dispensed with.

In operation, the cutter may be primarily driven by the frictional-wedging drive connection above referred to, but a positive drive results from the minor portion 12 of the cutter stem in the bore 7, the portion 12 being very sturdy notwithstanding the presence of the way 16 extending through it. In practice it has been found superior to the common angular tang found on drills, taps, counterborers and the like which are often twisted off, rendering the tool useless. Furthermore the way 16 is desirable where a pilot is used, and for cooling purposes, and would further weaken a tool provided with an ordinary tang.

I claim:

1. In a boring tool the combination of a socket holder and a cutter including a cutting head and a shank detachably received in said socket holder, the socket holder provided with a first, relatively long tapered central axial bore for a portion of its length with its wider portion nearest the open end of the socket, a second relatively short bore at the inner end of said tapered bore, coaxial therewith and of greater diameter than said inner end, and a third reduced cylindrical bore eccentric to said first and second bores and located at the inner end of said second bore, and said shank provided with a frusto-conical portion in frictional-wedging cooperation with the wall of said first bore, and a reduced eccentrically located cylindrical portion forming an extension of said frusto-conical portion, in telescopic relation in said third bore, and with the smaller end of the frusto-conical portion accommodated in, but out of contact with the wall of said second bore.

2. In a boring tool, the combination of a socket holder and a cutter including a cutter head and a shank detachably received in said socket holder, the socket holder provided with a tapered central axial bore for a portion of its length, with its wider end near the open end of the socket, and a reduced cylindrical bore eccentrically located with respect to and forming an extension of the smaller end of said tapered bore, and said shank provided with a frusto-conical portion in frictional-wedging drive cooperation with the wall of said tapered bore and a reduced eccentrically located cylindrical portion forming an extension of said frusto-conical portion, in telescopic relation in said eccentrically located bore, to form a positive drive between the socket holder and the cutter.

3. In a counterboring tool, the combination of a socket holder, a counterboring tool including a cutting head and a shank, and a pilot for the counterboring tool including a stem, said socket holder provided with a tapered central axial bore for a portion of its length with its wider end near the open end of the socket, a reduced cylindrical bore eccentrically located with respect to and forming an extension of the smaller end of said tapered bore, and a transverse hole open to the inner end of said reduced cylindrical bore and to the outside of the socket holder, said shank provided with a frusto-conical portion in frictional-wedging drive cooperation with the wall of said tapered bore, and a reduced eccentrically located cylindrical portion forming an extension of said frusto-conical portion in telescopic relation with said eccentrically located bore, to form a positive drive between the socket holder and counterboring tool, and said counterboring tool provided with an axial way, for the stem of said pilot, said axial way open at the leading end of said head and the free end of said eccentrically located portion of the stem, and extending throughout the length of said frusto-conical and reduced cylindrical portions of said shank to accommodate said pilot stem, and said pilot stem extending only throughout a portion of the length of said axial way, whereby heat resulting from operation of the tool may find egress to the atmosphere through said way and transverse hole.

4. In a counterboring tool, the combination of a socket holder, a counterboring tool including a cutting head and a shank, and a pilot for the counterboring tool including a stem, said socket holder provided with a major central axial bore upon at its tool receiving end, a reduced minor cylindrical bore eccentrically located with respect to and forming an extension of said major bore, and a transverse hole open to the inner end of said reduced cylindrical bore and to the outside of the socket holder, said shank provided with a major portion fitting said major bore of the holder and a reduced minor eccentrically located cylindrical portion forming an extension of said major portion of the stem in telescopic relation to said minor bore of the holder, to form a positive drive between the socket holder and counterboring tool, and said counterboring tool provided with an axial way, for the stem of said pilot, said axial way open at the leading end of said head and open to the free end of said minor portion of the stem, and extending throughout the length of said major and minor portions of said shank to accommodate said pilot stem, and said pilot stem extending only throughout a portion of the length of said axial way, whereby heat resulting from operation of the tool may find egress to the atmosphere through said way and transverse hole.

VICTOR E. SMITH.